No. 698,642. Patented Apr. 29, 1902.
T. DUNCAN.
ELECTRIC METER.
(Application filed Aug. 18, 1898.)
(No Model.)
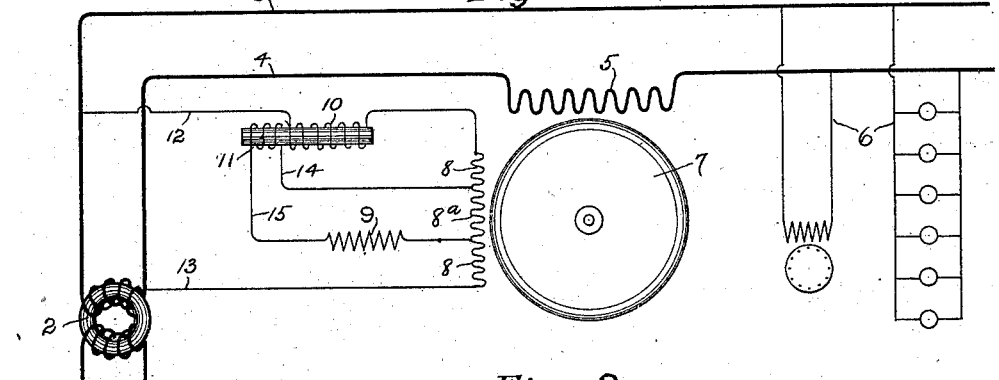
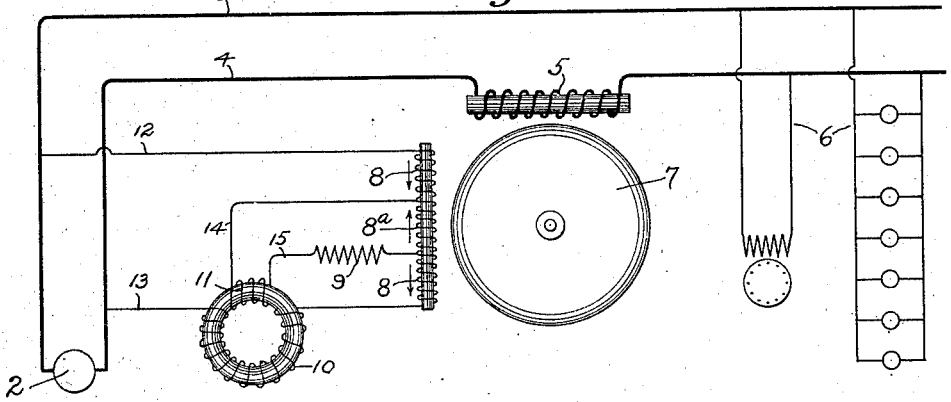
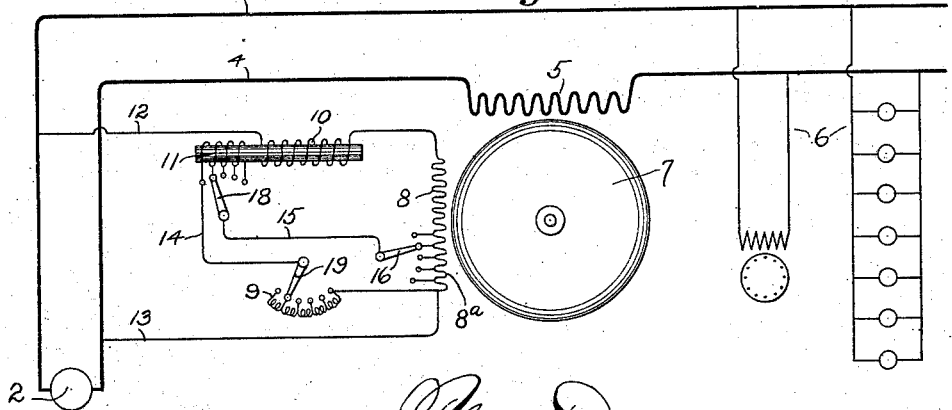
Witnesses
Samuel A. Bachtel.
Adelaide Kearns.
Thomas Duncan Inventor
By his Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,642, dated April 29, 1902.

Application filed August 18, 1898. Serial No. 688,862. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My present invention relates to improvements in induction motor-meters, and more particularly in means for obtaining a magnetic field in quadrature with the electromotive force of the supply system represented by the said magnetism.

One object of my invention is to simplify the method of obtaining a magnetic field that will lag ninety degrees behind the electromotive force without employing a separate coil in coöperative relation with a volt or shunt coil—the method hitherto in vogue.

Another object of my invention is to provide a meter that will measure a lagging current or one displaced in phase from its electromotive force.

The principal elements entering into the construction of my improvement are a source of alternating currents 2, supply-mains 3 and 4, a series field-coil 5, translating devices 6, a revoluble metallic armature 7, a volt-coil 8, a resistance 9, an impedance-coil 10, a phase-lagging coil 11, circuit-wires 12 and 13 for supplying current to the said impedance-coil and to the volt-coils 8 and its auxiliary winding $8^a$, circuit-wires 14 and 15 for connecting the phase-lagging coil 11 to the portion $8^a$ of the volt-coil 8, and a switch 16 for varying the number of turns of the portion $8^a$ of the coil 8, as hereinafter more fully described.

In the accompanying drawings similar reference-numerals indicate like parts.

Figure 1 is a diagrammatic view of my invention, showing the mutual inductive relation of the coils 10 and 11 and also the manner in which the latter is connected to a minor portion $8^a$ of the turns comprising the volt-coil 8. Fig. 2 is a somewhat similar view showing by means of arrows the direction of the magnetomotive forces of the windings 8 and $8^a$ of the volt-coil. Fig. 3 shows the addition of a switch 16 for varying the number of turns of the portion $8^a$ of the volt-coil and also shows a switch 18 for bringing into circuit one or more of the turns comprising the phase-lagging coil 11.

Special reference is now made to Fig. 1, in which a source of alternating currents 2 supplies the translating devices 6 by means of the circuit-mains 3 and 4. A series field-coil 5 is included in one of the said circuit-mains 4, so that all the current supplied to the translating devices is obliged to traverse the coil 5 and cause it to generate a magnetic field the strength of which will vary in proportion to the current through the said main 4 or directly, as the amperes.

When the load is incandescent lamps or practically non-inductive, the current through the coil 5, with its accompanying magnetism, will be in phase with the electromotive force.

To enable the meter to measure inductive loads, the magnetism representing the electromotive force must be in quadrature therewith or lagging ninety degrees therefrom—that is, when the current in the work-circuit is non-inductive its magnetism or that of the coil 5 must be in advance of the magnetism of the volt-coil 8 and the said portion $8^a$ which represents the electromotive force by ninety degrees.

To obtain a lag of ninety of the magnetism representing the pressure, I employ a volt-coil 8 in series with an impedance-coil 10.

The lag produced by the introduction of the impedance-coil is not sufficient to give a ninety-degree lag, for reasons well understood in the art.

To produce exact quadrature, I employ a portion $8^a$ of the convolutions or turns comprising the volt-coil 8 and energize them from a phasing-coil 11. The said volt-coil and its portion $8^a$ are connected in series with each other and with the impedance-coil 10, as shown. The phase-lagging coil 11 is wound in inductive relation to the impedance-coil 10 and has its terminals 14 and 15 connected to the said auxiliary portion 8ª of the volt-coil 8. This combination gives a current through 12, 10, 8, 8ª, 8, and 13 and a second current of greater lag through 11, 14, 15, 9, and 8ª, thereby setting up a magnetic field in the volt-coil, that is a resultant of the magnetism of the coil 8 and the magnetism of its auxiliary portion 8ª.

By an adjustment of the resistance 9 the resultant magnetism of the windings 8 and 8ª can easily be brought to ninety degrees.

I also find that by reversing the convolutions of the auxiliary coil or winding 8ª, so that they set up an opposing magnetomotive force, as indicated by the direction of the arrows in Fig. 2, the adjustment of the resultant magnetism of the portions or windings 8 and 8ª is more easily obtained.

Fig. 3 shows a switch 18 for varying the turns of the phase-lagging coil 11, a second switch 19 for varying the resistance 9, and a third switch 16 for varying the number of convolutions comprising the auxiliary portion 8ª, any or all of which may contribute to bring about the desired lag of the magnetism representing the electromotive force. If the angle of lag of the magnetism is too great or exceeds ninety degrees, the meter will run too fast on inductive loads, and the said angle may be reduced by cutting out a portion of the turns in coil 8ª or coil 11 or by increasing the resistance at 9. If the meter runs slow on inductive loads, the resistance 9 should be reduced or the turns in the coils 8ª and 11 may be increased to give the desired lag in an economical and simple manner.

What I desire to secure by Letters Patent is—

1. In a meter, the combination with current and pressure windings of an impedance-coil included in series with the pressure-winding and a phase-lagging coil in inductive relation with the aforesaid impedance-coil included in a closed circuit with a portion only of the pressure-winding, substantially as described.

2. In a motor, the combination with field-producing windings of an impedance-coil in series with one of the said windings and a phase-modifying coil included in a closed circuit with a portion only of the latter winding and in inductive relation to the said impedance-coil, substantially as described.

3. In a meter, the combination with current and pressure windings of an impedance-coil included in circuit with the pressure-winding, and a phase-lagging coil in inductive relation with the aforesaid impedance-coil included in a closed circuit with a portion only of the pressure-winding, substantially as described.

4. In a motor, the combination with field-producing windings of an impedance-coil in circuit with one of the said windings, and a phase-modifying coil included in a closed circuit with a portion only of the latter winding and in inductive relation to the said impedance-coil, substantially as described.

5. In a meter, the combination with current and pressure windings of an impedance-coil included in series with pressure-winding turns, and a coil in inductive relation with the impedance-coil included in a closed circuit with the said turns of the pressure-winding, independently of the impedance-coil, substantially as described.

6. In a motor, the combination with field-producing windings of an impedance-coil included in series with turns of one of the said windings, and a coil in inductive relation with the impedance-coil included in a closed circuit with the said turns, independently of the impedance-coil, substantially as described.

7. In a meter, the combination with current and pressure windings of an impedance-coil included in circuit with pressure-winding turns, and a coil in inductive relation with the impedance-coil included in a closed circuit with the said turns of the pressure-winding, independently of the impedance-coil, substantially as described.

8. In a motor, the combination with field-producing windings of an impedance-coil included in circuit with turns of one of the said windings, and a coil in inductive relation with the impedance-coil included in a closed circuit with the said turns, independently of the impedance-coil, substantially as described.

Signed by me at Fort Wayne, Allen county, State of Indiana, this 16th day of August, A. D. 1898.

THOMAS DUNCAN.

Witnesses:
ADELAIDE KEARNS,
EDWARD F. TIERNEY.